F. BEUCKMANN.
DISH SCRAPER.
APPLICATION FILED JAN. 22, 1921.

1,401,457.  Patented Dec. 27, 1921.

WITNESSES

INVENTOR
Frank Beuckmann,
BY
ATTORNEYS

UNITED STATES PATENT OFFICE.

FRANK BEUCKMANN, OF EAST ST. LOUIS, ILLINOIS.

DISH-SCRAPER.

1,401,457.  Specification of Letters Patent.  Patented Dec. 27, 1921.

Application filed January 22, 1921. Serial No. 439,162.

*To all whom it may concern:*

Be it known that I, FRANK BEUCKMANN, a citizen of the United States, and a resident of East St. Louis, in the county of St. Clair and State of Illinois, have invented certain new and useful Improvements in Dish-Scrapers, of which the following is a specification.

My invention is an improvement in cleaning devices especially adapted for use in cleansing plates, pots and the like.

The invention forming the subject matter of this application is also capable of use as a cleaning device in candy shops, bakeries, laboratories, etc.

An important object of this invention is to provide a cleaning device having a scraping head of flexible material capable of bending slightly so that the same may be employed for cleaning the sides and bottoms of cooking utensils and dishes.

Another object of the invention is to provide a cleaning device having a scraping blade of elongated formation and which is provided with oppositely arranged scraping edges which permit the device to be arranged within small bowls and the like for cleaning the same.

One of the principal features of this invention is the fact that the same is exteriorly smooth so that when it is desired to clean the blade of the same, it is only necessary to draw the blade across the edge of a refuse pail, thereby removing the dirt.

A further object of the invention is to provide a cleaning device which is simple to use, cheap to manufacture and neat in appearance.

Other objects and advantages of the invention will be apparent during the course of the following description.

In the accompanying drawings, forming a part of this application, in which like numerals are employed to designate like parts throughout the same, Figure 1 is a side elevation of the improved cleaning device.

Figure 1:
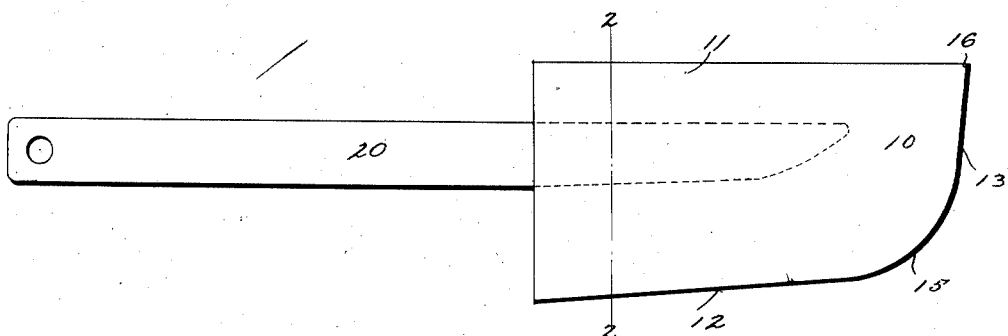
Figure 3:
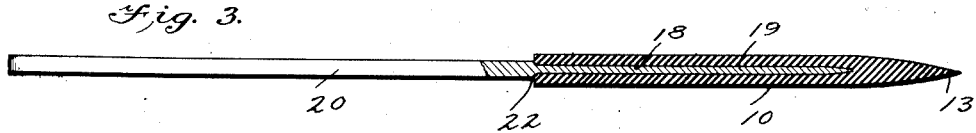
Fig. 3 is a horizontal longitudinal sectional view through the device, parts shown in elevation.

In the drawing, wherein for the purpose of illustration is shown a preferred embodiment of the invention, the numeral 10 designates a blade which may be formed of rubber or other suitable material. As illustrated in Figs. 1 and 3, the blade 10 is of elongated formation and is formed with scraping edges 11 and 12 which are formed by decreasing the blade in thickness from its longitudinal center to its edges. The scraping edge 12 has its forward end curved and joined with a scraping edge 13 formed at the forward end of the elongated body 10 and approximately at right angles to the scraping edges 11 and 12. The juncture between the edges 12 and 13 provides a rounded edge 15 which permits the device to be used in scraping the corners of dishes, posts, pans and the like.

The juncture of the edges 11 and 13 forms what might be termed a point 16 which permits the device to be used in removing the dirt from very sharp corners and so forth.

The body 10 is provided between its longitudinal edges with a longitudinal socket 18 which terminates short of the forward end and opens out through its rear end for receiving the shank 19 of a handle 20.

Figure 2:
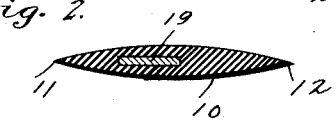
Fig. 2 is a sectional view taken on the line 2—2 of Fig. 1.

With reference to Fig. 3 it will be observed that the shank 19 has its forward end pointed so that the same may be inserted into the socket with but a small effort on the part of the operator. The shank 19 is somewhat less in width than the handle so as to form a pair of oppositely arranged shoulders 22 which limit the movement of the shank into the yieldable body. As illustrated in Figs. 1, 2, and 3 the yieldable blade is exteriorly smooth so that when desired the same may be quickly and thoroughly cleaned by merely scraping the blade across the edge of a refuse receptacle. There are no projections which would prevent any portion of the opposite surfaces of the blade from being thoroughly cleaned.

Figure 4:
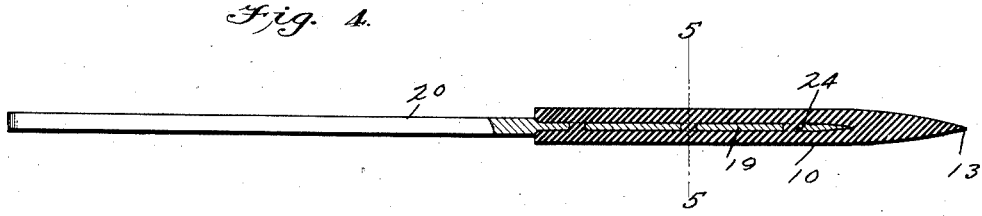
Fig. 4 is a horizontal longitudinal sectional view through a modified form of the cleaning device, parts being shown in elevation.
Figure 5:
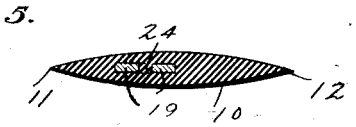
Fig. 5 is a vertical transverse sectional view taken on line 5—5 of Fig. 4.

In the form of the invention illustrated in Figs. 4 and 5, the shank is provided with spaced openings 24 and a quantity of the rubber is embedded in the openings 24 so as to securely connect the blade to the shank.

In the operation of the device, the same may by reason of the oppositely arranged scraping edges 11 and 12 be employed for cleaning very small bowls and other receptacles.

When using the device for scraping the refuse from dishes or pans the same is operated by a scraping motion which thoroughly removes refuse from the receptacle. Also, the device may be employed for removing the crumbs, etc., from a table. By reason of the fact that the scraping edges 11 and 12 extend substantially parallel to the longitudinal axis of the handle, the device is extremely simple and efficient in operation.

In connecting the shank to the handle 20 of the blade the shank may be secured within a pocket or recess of the blade by means of cement, glue or the like. Also the shank of the handle may terminate reasonably close to the end of the blade so that the forward portion of the blade will not be permitted to bend or buckle. In carrying out the invention the handle may be made of any desired shape, or any desired material.

When the blade is molded to shank, the shank can be prepared by coating or wrapping with material used for such purposes or the blades can be molded to the shank without any coating or wrapping or any holes, grooves or corrugations in the shank. Also if desired the handle and the shank may be made perfectly plain.

It is to be understood that the forms of the invention herewith shown and described are to be taken as preferred examples of the same and that such minor changes and arrangements and construction of parts may be made as will remain within the spirit of the invention and the scope of what is claimed.

Having thus described my invention what I claim as new is:—

1. A cleaning device comprising a scraping blade of yieldable material gradually reduced toward its edges to form a pair of oppositely arranged scraping edges, one of said scraping edges being curved longitudinally and joined with the forward end of the other scraping edge to form a third scraping edge at the forward end of the blade, the rear end portion of the blade being formed with a centrally arranged longitudinally extending socket between said first named scraping edges, a handle having a reduced shank received within said socket, said handle being provided with oppositely arranged shoulders engaging the rear end of said blade, said blade having all of its sides smooth throughout.

2. A cleaning device comprising a yieldable body having oppositely arranged scraping edges, a handle having a shank embedded in said yieldable body and having openings receiving portions of said yieldable body whereby the handle is firmly connected to said yieldable body, said handle being provided with a pair of oppositely arranged shoulders engaging the rear end of said body.

FRANK BEUCKMANN.